US012583701B2

(12) United States Patent　　　(10) Patent No.: US 12,583,701 B2
Nishikawa et al.　　　　　　　　(45) Date of Patent: Mar. 24, 2026

(54) CONVEYER APPARATUS AND MEANDERING CORRECTION METHOD

(71) Applicant: Panasonic Intellectual Property Management Co., Ltd., Kadoma (JP)

(72) Inventors: Kazutaka Nishikawa, Nara (JP); Yasushi Taniguchi, Osaka (JP); Masahiro Nakajo, Osaka (JP); Masanori Kuroda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 25 days.

(21) Appl. No.: 18/703,111

(22) PCT Filed: Aug. 31, 2022

(86) PCT No.: PCT/JP2022/032742
　　　§ 371 (c)(1),
　　　(2) Date: Apr. 19, 2024

(87) PCT Pub. No.: WO2023/067904
　　　PCT Pub. Date: Apr. 27, 2023

(65) Prior Publication Data
　　　US 2025/0223129 A1　　Jul. 10, 2025

(30) Foreign Application Priority Data

Oct. 22, 2021　(JP) ................................. 2021-173380

(51) Int. Cl.
　　　*B65H 23/038*　　(2006.01)
　　　*H01M 10/04*　　(2006.01)

(52) U.S. Cl.
　　　CPC ...... *B65H 23/038* (2013.01); *H01M 10/0404* (2013.01); *B65H 2406/1115* (2013.01);
　　　　　　　　(Continued)

(58) Field of Classification Search
　　　CPC .......... B65H 23/038; B65H 2406/1115; B65H 2301/443243; B65H 20/10; B65H 27/00
　　　See application file for complete search history.

(56) References Cited

U.S. PATENT DOCUMENTS

2019/0359426 A1　11/2019　Akasaka

FOREIGN PATENT DOCUMENTS

JP　　S62-002558 U　　1/1987
JP　　H06-271162 A　　9/1994
　　　　　　(Continued)

OTHER PUBLICATIONS

International Search Report dated Oct. 25, 2022, issued in counterpart International Application No. PCT/JP2022/032742 (5 pages).

*Primary Examiner* — Jeremy R Severson
(74) *Attorney, Agent, or Firm* — WHDA, LLP

(57) ABSTRACT

A floatation roll supports a work to be conveyed contactlessly using a force applied to the work contactlessly. The floatation roll has a cylindrical shape extending in a direction of width of the work, and at least a surface of the floatation roll facing the work being formed by a circumferential surface. A driving unit rotates the floatation roll in a yaw direction. Of a wrap angle of the work supported by the floatation roll contactlessly, a wrap angle on an entry side with respect to an apex point and a wrap angle on an exit side with respect to the apex point are set to be different.

3 Claims, 7 Drawing Sheets

1

(52) U.S. Cl.
CPC .. *B65H 2553/412* (2013.01); *B65H 2701/173*
(2013.01); *B65H 2801/72* (2013.01); *Y02E*
*60/10* (2013.01)

(56)        References Cited

FOREIGN PATENT DOCUMENTS

| | | | |
|---|---|---|---|
| JP | H09-274910 | A | 10/1997 |
| JP | 2000-086032 | A | 3/2000 |
| JP | 2002-179310 | A | 6/2002 |
| JP | 2018-162121 | A | 10/2018 |

CONVEYER APPARATUS AND MEANDERING CORRECTION METHOD

CROSS-REFERENCE TO RELATED APPLICATIONS

This application is based upon and claims the benefit of priority from the prior Japanese Patent Application No. 2021-173380, filed on Oct. 22, 2021, and the International Patent Application No. PCT/JP2022/032742, filed on Aug. 31, 2022, the entire content of each of which is incorporated herein by reference.

BACKGROUND

Field of the Invention

The present disclosure relates to a conveyer apparatus and a meandering correction method.

Description of the Related Art

In recent years, development of lithium metal secondary batteries using lithium metal as the negative electrode has progressed. A lithium metal secondary battery has a higher energy density than a lithium ion secondary battery, and the theoretical capacity of a lithium metal negative electrode is extremely large, i.e., about 10 times that of a general graphite negative electrode. Recent development has led to advanced measures to deal with formation of lithium metal dendrites, which has been an issue in lithium metal secondary batteries, and popularization of lithium metal secondary batteries is expected.

There is a method of forming a negative electrode of a lithium metal secondary battery by bonding a lithium foil to a metal foil (e.g., a copper foil) to be used as a substrate. A lithium foil thinly rolled to about 5-10 μm is easy to break and requires care in conveyance. There is a method of conveying a lithium foil sandwiched between films (e.g., PP films) or a method of using a floatation roll to convey a lithium foil by floatation conveyance in a state of non-contact with the roll. In this specification, the latter method, which does not require a film bonding and peeling process, will be focused.

In roll-to-roll conveyance, contactless floatation conveyance is known to be free from contact resistance and enables low-tension conveyance in a comparison with contact conveyance. In floatation conveyance, however, meandering of a work (also called a web) is likely to occur. In addition, since the roll does not come into contact with the work, the mechanism for correcting a meandering work becomes complicated. In particular, lithium metal is the lightest among the metal elements, and meandering is likely to occur in floatation conveyance.

Patent literature 1 discloses a conveyer apparatus that supports a strip member in a contactless state by ejecting an airflow from a support pad to each of the front and back surfaces of the strip member to be conveyed. In that conveyer apparatus, meandering of the strip member is corrected by tilting the support pad in the direction of width of the strip member.

[Patent Literature 1] JP 2018-162121

In the method of correcting meandering of the work by tilting the floatation roll in the direction of width of the work, a difference is created in the loads applied to the right end side and the left end side of the work in the width direction when meandering correction is performed. Consequently, the portion of the work near the passage of the floatation roll is twisted, and the work is easily torn in the width direction.

SUMMARY OF THE INVENTION

The present disclosure addresses the issue described above, and a purpose thereof is to provide a technology for realizing meandering correction with a low risk of a work to be conveyed in floatation conveyance being broken.

A conveyer apparatus according to an embodiment of the present disclosure includes: a floatation roll that supports a work to be conveyed contactlessly using a force applied to the work contactlessly, the floatation roll having a cylindrical shape extending in a direction of width of the work, and at least a surface of the floatation roll facing the work being formed by a circumferential surface; a driving unit that rotates the floatation roll in a yaw direction. Of a wrap angle of the work supported by the floatation roll contactlessly, a wrap angle on an entry side with respect to an apex point and a wrap angle on an exit side with respect to the apex point are set to be different.

Optional combinations of the aforementioned constituting elements, and implementations of the disclosure in the form of methods, apparatuses, and systems may also be practiced as additional aspects of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
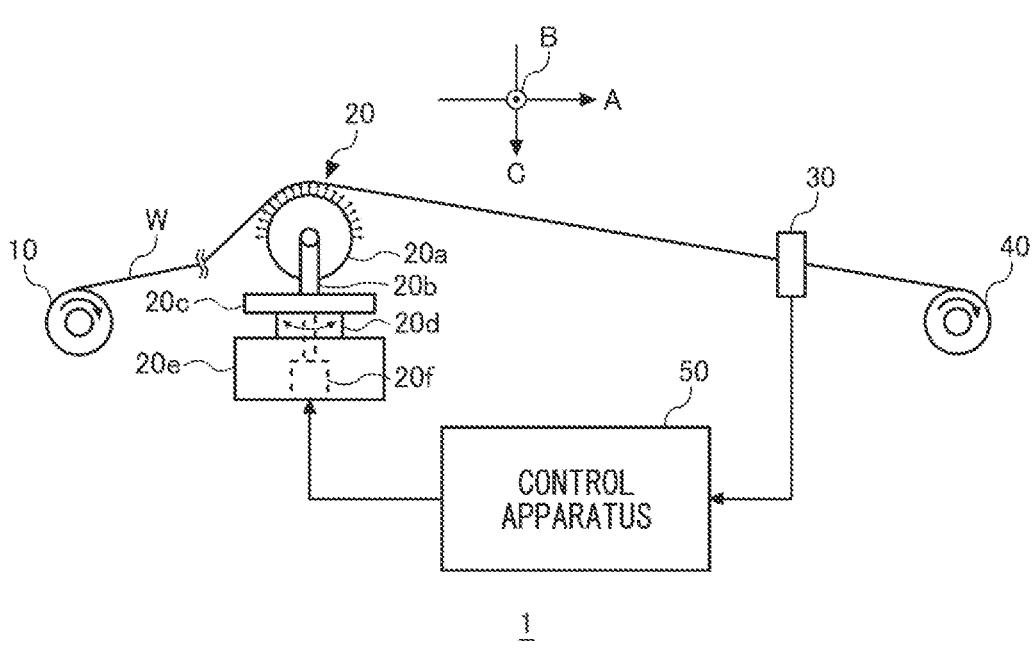
FIG. 1 is a side view schematically showing a conveyer apparatus according to the embodiment.

Hereinafter, the present disclosure will be described based on preferred embodiments with reference to drawings. The embodiments do not limit the scope of the present disclosure but exemplify the disclosure. Not all of the features and the combinations thereof described in the embodiments are necessarily essential to the present disclosure. Identical or like constituting elements, members, processes shown in the drawings are represented by identical symbols and a duplicate description will be omitted as appropriate.

The scales and shapes shown in the figures are defined for convenience's sake to make the explanation easy and shall not be interpreted limitatively unless otherwise specified. Terms like "first", "second", etc. used in the specification and claims do not indicate an order or importance by any means unless otherwise specified and are used to distinguish a certain feature from the others. Those of the members that are not material to the description of the embodiments are omitted in the drawings.

FIG. 1 is a side view schematically showing a conveyer apparatus 1 according to the embodiment. The conveyer apparatus 1 is a roll-to-roll conveyer apparatus and includes a feed apparatus 10, a flotation roll apparatus 20, an edge sensor 30, a take-up apparatus 40, and a control apparatus 50.

The feed apparatus 10 is disposed at the starting point of a conveyer line, holds a work W to be conveyed in a wound state, and feeds the work W to the downstream side of the conveyer line. The take-up apparatus 40 is disposed at the end point of the conveyer line and takes up the conveyed work W in a wound state. The feed apparatus 10 and the take-up apparatus 40 each has a servo motor (not shown), and the servo motor is adapted to control the rotation speed and rotation torque of the roll. The feed speed of the feed apparatus 10 and the take-up speed of the take-up apparatus 40 are basically configured to equal.

In this embodiment, the work W is assumed to be a lithium foil to be used as a negative electrode plate of a lithium metal secondary battery. The lithium foil to be conveyed in this embodiment is a lithium foil rolled to a thickness of about 5-10 μm and has a risk of being broken even if a small tension is applied. In addition, lithium has the property of bonded to metals easily. When a guide roll made of a metal (e.g., aluminum) is used, therefore, the tension is likely to increase in the guide roll. In this embodiment, therefore, a flotation roll apparatus 20 capable of conveying the work W contactlessly is used.

The flotation roll apparatus 20 is disposed between the feed apparatus 10 and the take-up apparatus 40 on the conveying line. A tension control mechanism (e.g., a dancer roll) for controlling the tension applied to the work W at a constant level may be disposed between the feed apparatus 10 and the flotation roll apparatus 20 on the conveying line, although the feature is omitted in FIG. 1.

The flotation roll apparatus 20 supports the conveyed work W contactlessly. The flotation roll apparatus 20 includes a contactless support roll 20a, a support arm 20b, a rotating seat 20c, a rotating shaft 20d, a fixed seat 20e, and a motor 20f.

The contactless support roll 20a is a cylindrical body extending in the direction of width B of the work W and supports the work W contactlessly by blowing out a fluid from the outer circumferential surface thereof. In this embodiment, air is assumed as the fluid to be blown out, but other gases such as nitrogen may be used. The radial cross-sectional shape of the contactless support roll 20a may be a semicircle or a semi-ellipse instead of a full circle or an ellipse. In these cases, the cross-sectional shape on the side that does not form an arc is formed in a rectangle. The contactless support roll 20a does not rotate, and the outer circumferential surface composed of a semicircle or semi-ellipse is disposed in an orientation facing the work W. The radial cross-sectional shape of the contactless support roll 20a may be a fan (e.g., a fan having a center angle of 90 degrees).

For example, a known air turn bar can be used as the contactless support roll 20a. The air turn bar is covered with a thin metal (e.g., aluminum or stainless steel) plate on the outer circumference thereof. The thin metal plate is composed of, for example, a punching screen in which a large number of discharge holes are drilled. Instead of a punching screen, a porous substance such as a thin plate made of a porous foam, a porous thin plate of metal or sintered metal, or a mesh-like metal plate may be used.

Instead of drilling a plurality of holes in the metal thin plate, a plurality of slits extending in the direction of extension of the contactless support roll 20a may be formed at predetermined intervals in the radial direction. Further, a plurality of wires arranged at predetermined intervals in the extension direction may be wound around the outer circumferential surface of the metal thin plate.

A hollow fixed central shaft is inserted into the contactless support roll 20a, and an air supply pipe (not shown) is connected to an opening provided at one or both ends of the fixed central shaft, and a compressed air is supplied from an air supply apparatus such as a compressor (not shown) to the interior of the contactless support roll 20a via the air supply pipe. The supplied air is discharged from the large number of holes provided on the outer circumferential surface of the contactless support roll 20a.

The ends of the fixed central shaft of the contactless support roll 20a are supported by a pair of support arms 20b installed diagonally at the equal distance from the center in the support plane of the rotating seat 20c. The fixed seat 20e is fixed and installed on the floor. The fixed seat 20e is connected to the rotating seat 20c via the rotating shaft 20d. The output shaft of the motor 20f is connected to the end of the rotating shaft 20d toward the fixed seat 20e. The motor 20f is fixed and installed in the fixed seat 20e. The end of the rotating shaft 20d toward the rotating seat 20c is fixed to the rotating seat 20c. When the motor 20f is driven to rotate the rotating shaft 20d, the rotating seat 20c rotates. Driving of the motor 20f is controlled by the control apparatus 50.

The control apparatus 50 is implemented in hardware such as devices and circuits exemplified by a CPU and a memory of a computer, and in software such as a computer program. FIG. 1 depicts control apparatus 50 as a functional block implemented by the cooperation of these elements. It will be understood by those skilled in the art that this functional block is implemented in a variety of manners by a combination of hardware and software. The control apparatus 50 may be comprised of, for example, a control panel.

An edge sensor 30 is installed downstream of the flotation roll apparatus 20 on the conveyer line. The edge sensor 30 is a sensor for detecting misalignment of the work W to be conveyed on the conveying line in the width direction B. For example, the edge sensor 30 has a light emitting unit and a light receiving unit. The light emitting unit and the light receiving unit are installed at a predetermined interval in the thickness direction C so as to sandwich the work W from both sides of the work W in the thickness direction C. The light emitting unit and the light receiving unit may be installed above and below a U-shaped housing having a gap through which the work W passes.

The light emitting unit radiates a light of a predetermined wavelength (e.g., infrared rays) toward the light receiving unit. The light receiving unit has a light receiving element (e.g., CCD or CMOS) disposed on a surface facing the light emitting unit. When the light receiving element receives the light radiated from the light emitting unit, the light receiving element converts the received light into an electrical signal and outputs the electrical signal to the control apparatus 50 as an edge position signal. A portion of the light radiated from the light emitting unit is blocked by the end of the work W in the width direction B. Therefore, the edge sensor 30 can detect the edge position of the work W in the width direction based on the light receiving position of the light receiving element. An ultrasonic edge sensor may be used instead of an optical method.

Figure 2:
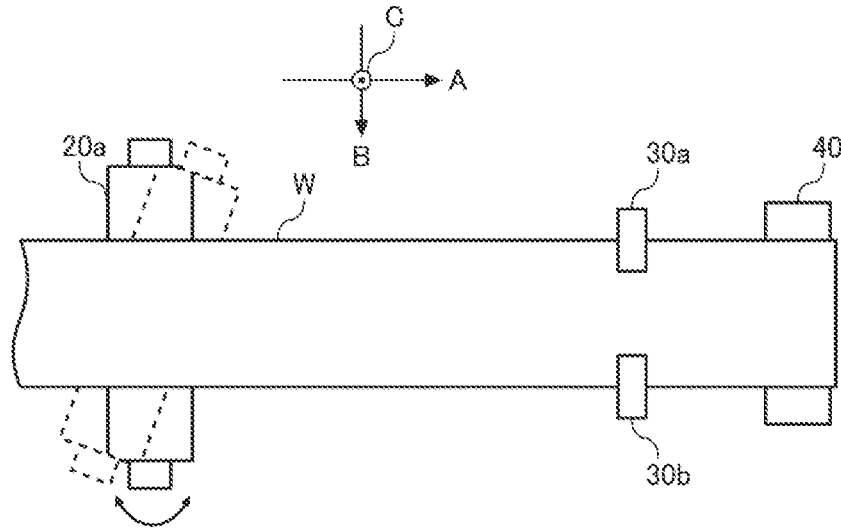
FIG. 2 is a plan view schematically showing how the conveyer apparatus shown in FIG. 1 conveys the work.

FIG. 2 is a plan view schematically showing how the conveyer apparatus 1 shown in FIG. 1 conveys the work W. As shown in FIG. 2, the edge sensor 30 may be installed at both ends of the work W in the width direction B. A first edge sensor 30a is installed on the left end side in the width direction B, and a second edge sensor 30b is installed on the right end side in the conveyance direction A of the work W. The first edge sensor 30a outputs, to the control apparatus 50, a first edge position signal indicating the left end position B, in the width direction B, of the work W to be conveyed. The second edge sensor 30b outputs, to the control apparatus 50, a second edge position signal indicating the rightmost position, in the width direction B, of the work W to be conveyed. The edge sensor 30 may not be installed at both ends in the width direction B as shown in FIG. 2, but may be installed only on either the left end side or the right end side. Further, the edge sensor 30 may be installed upstream of the flotation roll apparatus 20 on the conveyer line. However, the purpose of the edge sensor 30 is to confirm that no misalignment of the work W occurs when the work W is taken up by the take-up apparatus 40 located on the downstream side. Therefore, the conveyer apparatus 1 is preferably configured so that the edge sensor 30 is disposed on the downstream side of the flotation roll apparatus 20.

In this embodiment, the control apparatus 50 has a meandering correction function using the edge sensor 30 and the motor 20f of the flotation roll apparatus 20. In order to realize the meandering correction function, it is necessary to provide a difference between the wrap angle of the work W around the contactless support roll 20a on the entry side and that of the exit side.

Figure 3:
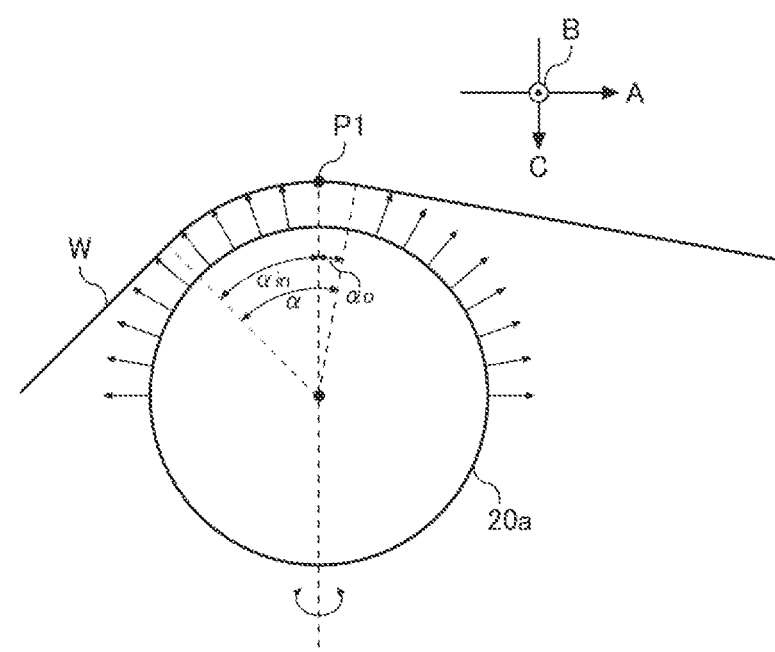
FIG. 3 is a side view schematically showing an example of the contactless support roll designed to have the wrap angle $\alpha_{in}$ on the entry side larger than the wrap angle $\alpha_o$ on the exit side.

FIG. 3 is a side view schematically showing an example of the contactless support roll 20a designed to have the wrap angle αin on the entry side larger than the wrap angle αo on the exit side. The wrap angle refers to the angle of an arc on the circumferential surface where the work W is supported by the contactless support roll 20a contactlessly. In the case of the contactless support roll 20a, the range of the circumferential surface on which the work W comes into contact with the roll 20a may be identified by assuming that there is no gap between the contactless support roll 20a and the work W.

The wrap angle α is determined based on the positions of the feed apparatus 10, the guide roll (not shown), etc. installed on the upstream side of the contactless support roll 20a, the positions of the take-up apparatus 40, the guide roll (not shown), etc. installed on the downstream side, the tension applied from the upstream side, and the tension applied from the downstream side. In the present specification, of the wrap angle α, the angle on the entry side with respect to the apex point P1 of the work W supported by the contactless support roll 20a contactlessly is referred to as the wrap angle αin on the entry side, and the angle on the exit side with respect to the apex point P1 is referred to as the wrap angle αo on the exit side. In the example shown in FIG. 3, the wrap angle α is set to 55 degrees, the wrap angle αin on the entry side is set to 45 degrees, and the wrap angle αo on the exit side is set to 10 degrees.

The control apparatus 50 detects the amount of misalignment of the work W from the target position in the width direction B based on the edge position signal input from the edge sensor 30. When edge sensors 30a and 30b are installed at both ends of the work W in the width direction B as shown in FIG. 2, the control apparatus 50 calculates an intermediate position between the left end position of the work W indicated by the first edge position signal input from the first edge sensor 30a and the right end position of the work W indicated by the second edge position signal input from the second edge sensor 30b. The control apparatus 50 determines the difference of the calculated intermediate position from the target center position of the work W in the width direction B to be the amount of misalignment.

When only the first edge sensor 30a is installed in the conveyer apparatus 1, the control apparatus 50 determines the difference of the left end position of the work W indicated by the first edge position signal input from the first edge sensor 30a from the target left end position of the work W in the width direction B to be the amount of misalignment. When only the second edge sensor 30b is installed in the conveyer apparatus 1, the control apparatus 50 determines the difference of the right end position of the work W indicated by the second edge position signal input from the second edge sensor 30b from the target right end position of the work B in the width direction B to be the amount of misalignment.

The control apparatus 50 calculates the amount of rotation the rotating shaft 20d driven by the motor 20f (i.e., the amount of rotation of the contactless support roll 20a in the yaw direction), based on the detected amount of misalignment (misalignment amount) of the work W in the width direction B. For example, the control apparatus 50 calculates the amount of rotation (control level) of the rotating shaft 20d by PID compensation. The control apparatus 50 subjects the amount of rotation of the rotating shaft 20d so that the amount of misalignment B of the work W in the width direction is 0. The control apparatus 50 supplies a control signal including the calculated amount of rotation to the motor 20f. According to the feedback control, the contactless support roll 20a rotates in a plane parallel to the conveyance direction A of the work W.

Figure 4A:
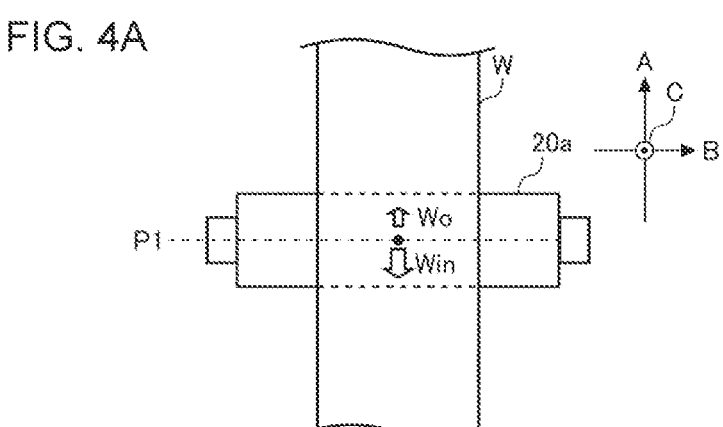
FIGS. 4A-4C are diagrams for explaining meandering correction control by the contactless support roll designed to have the wrap angle on the entry side larger than the wrap angle on the exit side.
Figure 4B:
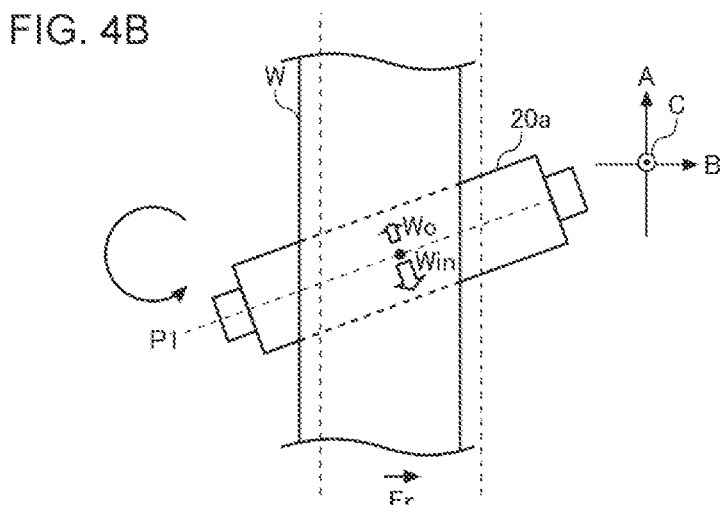
Figure 4C:
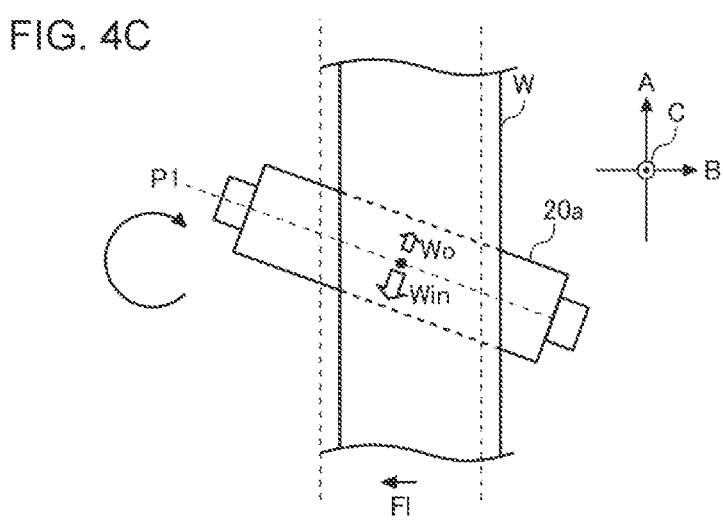

FIGS. 4A-4C are diagrams for explaining meandering correction control by the contactless support roll 20a designed to have the wrap angle αin on the entry side larger than the wrap angle αo on the exit side. When the wrap angle αin on the entry side is larger than the wrap angle αo on the exit side, the region, of the region of the work W supported by the contactless support roll 20a contactlessly, on the entry side with respect to the apex point P1 (hereinafter referred to as the wrap region on the entry side) faces the contactless support roll 20a across a predetermined distance or smaller over an area larger than that of the region on the exit side (hereinafter referred to as the wrap region on the exit side). Therefore, the wind force Win received by the wrap region on the entry side is larger than the wind force Wo received by the wrap region on the exit side.

FIG. 4A shows a state in which the amount of misalignment of the work W from the target position in the width direction B is 0, and the contactless support roll 20a is not rotated in the yaw direction and is kept at the reference position.

FIG. 4B shows a state in which the work W is misaligned leftward with respect to the conveyance direction A from the target position in the width direction B. The control apparatus 50 calculates the amount of counterclockwise rotation of the rotating shaft 20*d* according to the amount of misalignment, supplies the calculated amount of rotation to the motor 20*f*, and causes the motor 20*f* to rotate the contactless support roll 20*a* counterclockwise.

When the contactless support roll 20*a* rotates counterclockwise, the direction of blowing out the fluid relative to the wrap region on the entry side changes to the rear right direction with respect to the conveyance direction A, and the work W receives a pressure to move in the right direction. Further, the direction of blowing out the fluid relative to the wrap region on the exit side changes to the front left direction with respect to the conveyance direction A, and the work W receives a pressure to move in the left direction. Since the pressure to move rearward or forward is determined by the feed apparatus 10, the take-up apparatus 40, the tension roll (not shown), the guide roll (not shown), etc., the influence from the contactless support roll 20*a* can be ignored.

When the wrap angle αin on the entry side is larger than the wrap angle αo on the exit side, the wind force Win received by the wrap region on the entry side is larger than the wind force Wo received by the wrap region on the exit side, so that the pressure to move the work W in the right direction is larger than the pressure to move in the left direction. The pressures cancel each other out, and a pressure Fr to move in the right direction is applied to the work W. This pressure Fr to move in the right direction increases as the amount of counterclockwise rotation of the contactless support roll 20*a* approaches 90 degrees. The pressure Fr to move in the right direction causes the work W to move in the right direction toward the target position in the width direction B.

FIG. 4C shows a state in which the work W is misaligned rightward with respect to the conveyance direction A from the target position in the width direction B. The control apparatus 50 calculates the amount of clockwise rotation of the rotating shaft 20*d* according to the amount of misalignment, supplies the calculated amount of rotation to the motor 20*f*, and causes the motor 20*f* to rotate the contactless support roll 20*a* clockwise.

When the contactless support roll 20*a* rotates clockwise, the direction of blowing out the fluid relative to the wrap region on the entry side changes to the rear left direction with respect to the conveyance direction A, and the work W receives a pressure to move in the left direction. Further, the direction of blowing out the fluid relative to the wrap region on the exit side changes to the front right direction with respect to the conveyance direction A, and the work W receives a pressure to move in the right direction.

When the wrap angle αin on the entry side is larger than the wrap angle αo on the exit side, the wind force Win received by the wrap region on the entry side is larger than the wind force Wo received by the wrap region on the exit side, so that the pressure to move the work W in the left direction is larger than the pressure to move in the right direction. The pressures cancel each other out, and a pressure Fl to move in the left direction is applied to the work W. This pressure Fl to move in the left direction increases as the amount of clockwise rotation of the contactless support roll 20*a* approaches −90 degrees. The pressure Fl to move in the left direction causes the work W to move in the left direction toward the target position in the width direction B.

Figure 5:
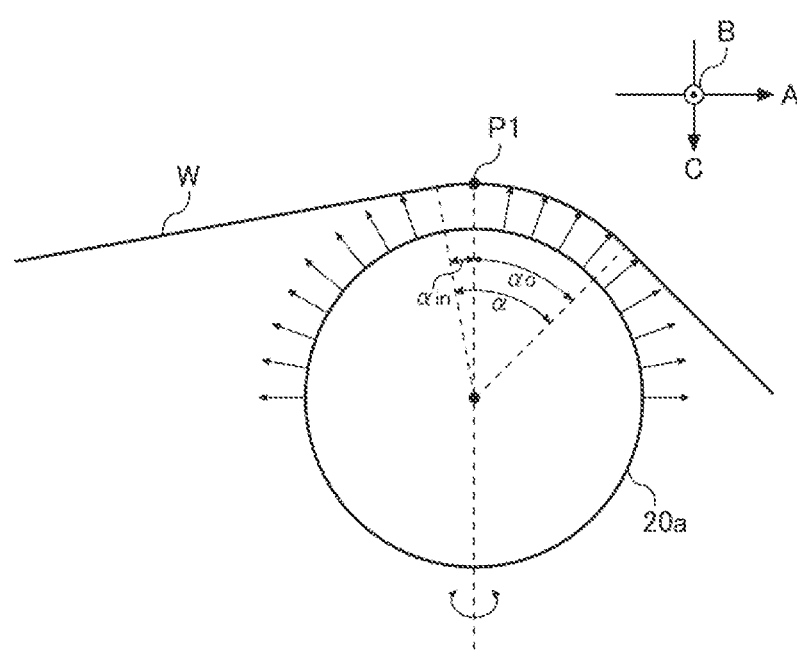
FIG. 5 is a side view schematically showing an example of the contactless support roll designed to have the wrap angle on the entry side smaller than the wrap angle on the exit side.

FIG. 5 is a side view schematically showing an example of the contactless support roll 20*a* designed to have the wrap angle αin on the entry side smaller than the wrap angle αo on the exit side. In the example shown in FIG. 5, the wrap angle α is set to 55 degrees, the wrap angle αin on the entry side is set to 10 degrees, and the wrap angle αo on the exit side is set to 45 degrees.

Figure 6A:
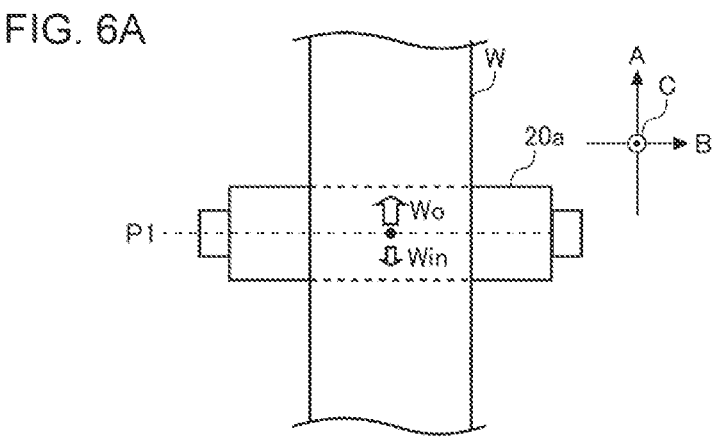
FIGS. 6A-6C are diagrams for explaining meandering correction control by the contactless support roll designed to have the wrap angle on the entry side smaller than the wrap angle on the exit side.
Figure 6B:
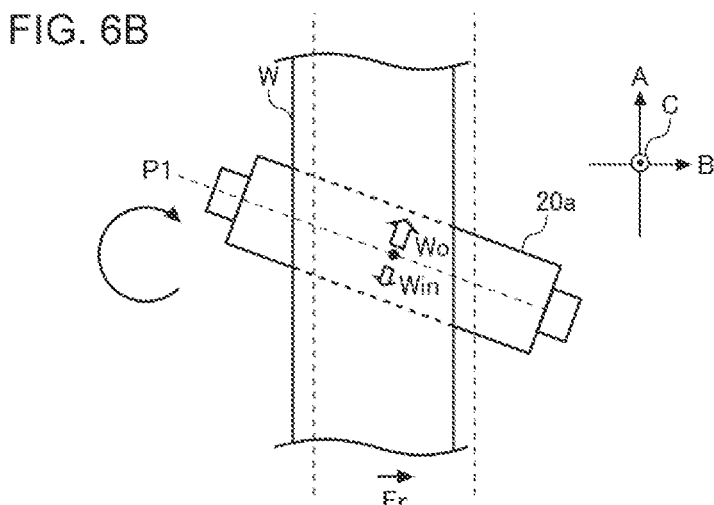
Figure 6C:
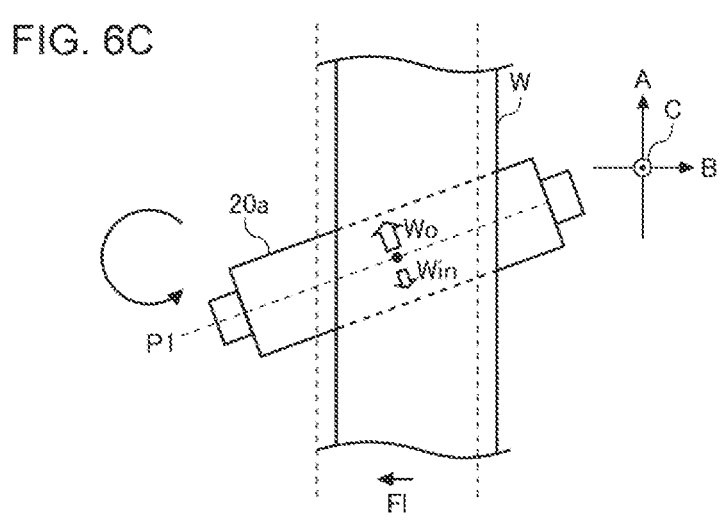

FIGS. 6A-6C are diagrams for explaining meandering correction control by the contactless support roll 20*a* designed to have the wrap angle αin on the entry side smaller than the wrap angle αo on the exit side. When the wrap angle αin on the entry side is smaller than the wrap angle αo on the exit side, the wrap region on the exit side faces the contactless support roll 20*a* across a predetermined distance or smaller over an area larger than that of the region on the entry side. Therefore, the wind force Wo received by the wrap region on the exit side is larger than the wind force Win received by the wrap region on the entry side.

FIG. 6A shows a state in which the amount of misalignment of the work W from the target position in the width direction B is 0, and the contactless support roll 20*a* is not rotated in the yaw direction and is kept at the reference position.

FIG. 6B shows a state in which the work W is misaligned leftward with respect the conveyance direction A from the target position in the width direction B. The control apparatus 50 calculates the amount of clockwise rotation of the rotating shaft 20*d* according to the amount of misalignment, supplies the calculated amount of rotation to the motor 20*f*, and causes the motor 20*f* to rotate the contactless support roll 20*a* clockwise.

When the contactless support roll 20*a* rotates clockwise, the direction of blowing out the fluid relative to the wrap region on the entry side changes to the rear left direction with respect to the conveyance direction A, and the work W receives a pressure to move in the left direction. Further, the direction of blowing out the fluid relative to the wrap region on the exit side changes to the front right direction with respect to the conveyance direction A, and the work W receives a pressure to move in the right direction.

When the wrap angle αin on the entry side is smaller than the wrap angle αo on the exit side, the wind force Wo received by the wrap region on the exit side is larger than the wind force Win received by the wrap region on the entry side, so that the pressure to move the work W in the right direction is larger than the pressure to move in the left direction. The pressures cancel each other out, and a pressure Fr to move in the right direction is applied to the work W. This pressure Fr to move in the right direction increases as the amount of clockwise rotation of the contactless support roll 20*a* approaches −90 degrees. The pressure Fr to move in the right direction causes the work W to move in the right direction toward the target position in the width direction B.

FIG. 6C shows a state in which the work W is misaligned rightward with respect to the conveyance direction A from the target position in the width direction B. The control apparatus 50 calculates the amount of counterclockwise rotation of the rotating shaft 20*d* according to the amount of misalignment, supplies the calculated amount of rotation to the motor 20*f*, and causes the motor 20*f* to rotate the contactless support roll 20*a* counterclockwise.

When the contactless support roll 20*a* rotates counterclockwise, the direction of blowing out the fluid relative to the wrap region on the entry side changes to the rear right direction with respect to the conveyance direction A, and the work W receives a pressure to move in the right direction. Further, the direction of blowing out the fluid relative to the wrap region on the exit side changes to the front left direction with respect to the conveyance direction A, and the work W receives a pressure to move in the left direction.

When the wrap angle αin on the entry side is smaller than the wrap angle αo on the exit side, the wind force Wo received by the wrap region on the exit side is larger than the wind force Win received by the wrap region on the entry side, so that the pressure to move the work W in the left direction is larger than the pressure to move in the right direction. The pressures cancel each other out, and a pressure Fl to move in the left direction is applied to the work W. This pressure Fl to move in the left direction increases as the amount of counterclockwise rotation of the contactless support roll 20a approaches 90 degrees. The pressure Fl to move in the left direction causes the work W to move in the left direction toward the target position in the width direction B.

The meandering correction function according to this embodiment utilizes the difference between the wind force Win received by the wrap region on the entry side and the wind force Wo received by the wrap region on the exit side when the contactless support roll 20a rotates in the yaw direction. Therefore, the function cannot be used when the wrap angle αin on the entry side and the wrap angle αo on the exit side are equal, and the wind force Win received by the wrap region on the entry side and the wind force Wo received by the wrap region on the exit side are equal.

Figure 7A:
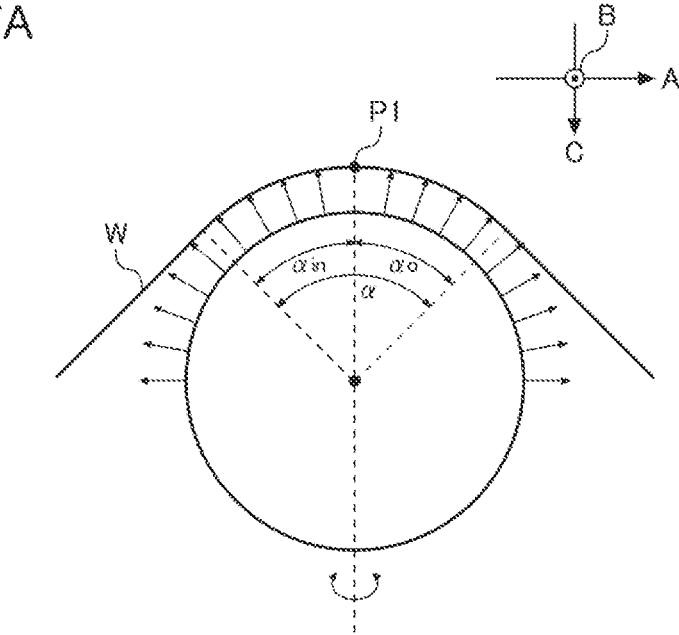
FIGS. 7A-7B are side views schematically showing examples of the contactless support roll in which the wrap angle on the entry side and the wrap angle on the exit side are designed to be equal.
Figure 7B:
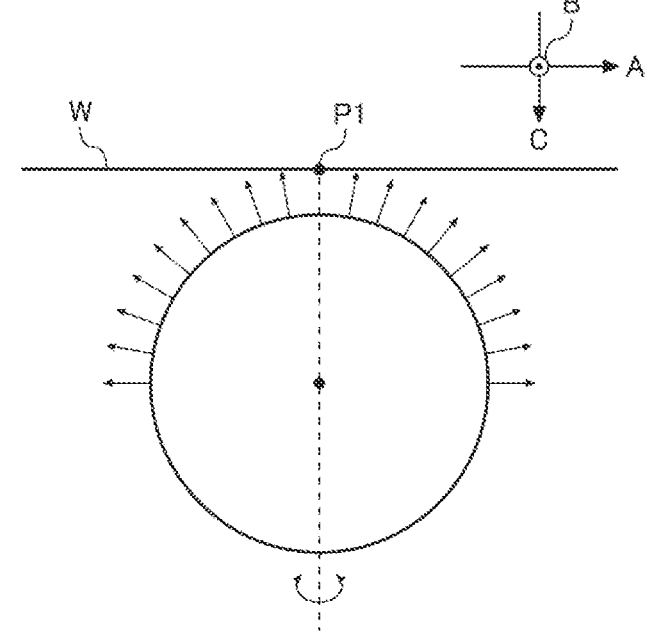

FIGS. 7A-7B are side views schematically showing examples of the contactless support roll 20a in which the wrap angle αin on the entry side and the wrap angle αo on the exit side are designed to be equal. FIG. 7B shows an example in which the work W does not warp in the thickness direction C (wrap angle α=wrap angle αin on the entry side=wrap angle αo on the exit side=0 degrees) and passes the contactless support roll 20a straight.

Figure 8A:
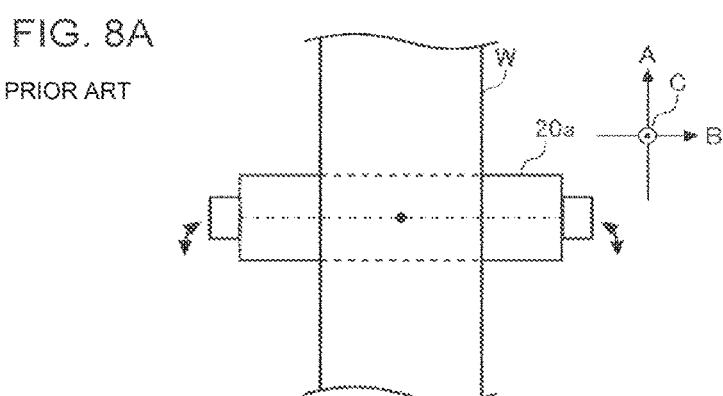
FIGS. 8A-8C are diagrams for explaining the meandering correction control according to a comparative example.
Figure 8B:
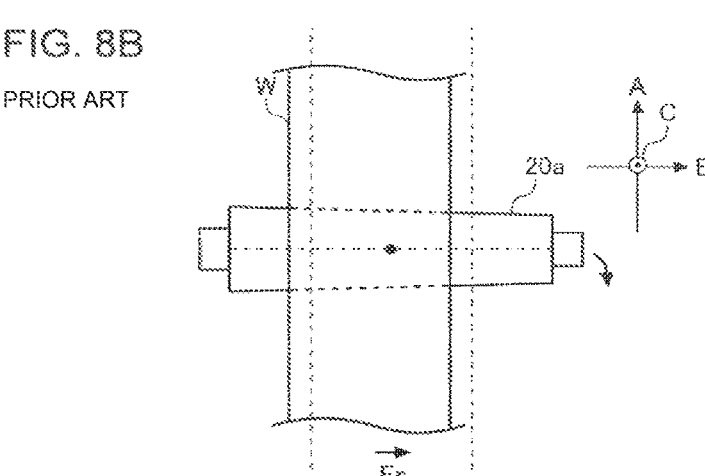
Figure 8C:
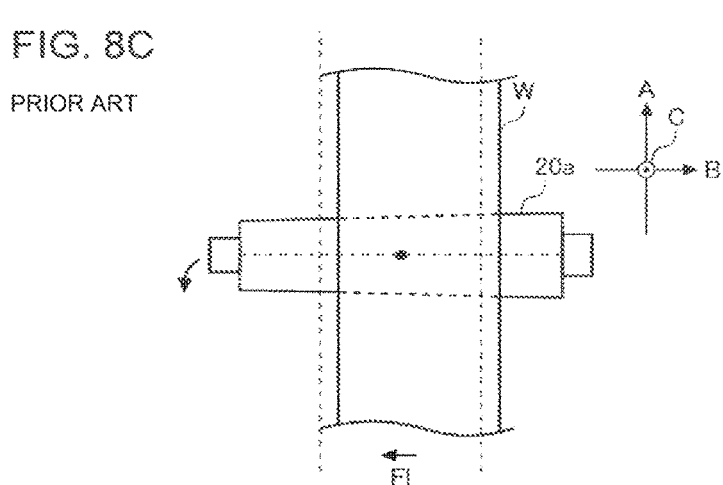

FIGS. 8A-8C are diagrams for explaining the meandering correction control according to a comparative example. The comparative example is an example of correcting the misalignment of the work W in the width direction by rotating the contactless support roll 20a in the roll direction.

FIG. 8A shows a state in which the amount of misalignment of the work W from the target position in the width direction B is 0, and the contactless support roll 20a is not rotated in the roll direction and is kept at the reference position.

FIG. 8B shows a state in which the work W is misaligned leftward with respect to the conveyance direction A from the target position in the width direction B. The control apparatus 50 rotates the contactless support roll 20a clockwise in the roll direction with respect to the conveyance direction A according to the amount of misalignment. That is, the right end of the contactless support roll 20a is tilted toward the floor surface so that the right end of the contactless support roll 20a approaches the floor surface.

As a result, the wind force received by the right end side of the work W from the contactless support roll 20a is weakened, and the wind force received by the left end side of the work W from the contactless support roll 20a becomes stronger so that the pressure Fr to move in the right direction is applied to the work W. The pressure Fr to move in the right direction increases as the amount of clockwise rotation of the contactless support roll 20a approaches −90 degrees. The pressure Fr to move in the right direction causes the work W to move in the right direction toward the target position in the width direction B.

FIG. 8C shows a state in which the work W is misaligned leftward with respect to the conveyance direction A from the target position in the width direction B. The control apparatus 50 rotates the contactless support roll 20a counterclockwise in the roll direction with respect to the conveyance direction A according to the amount of misalignment. That is, the left end of the contactless support roll 20a is tilted toward the floor surface so that the left end of the contactless support roll 20a approaches the floor surface.

As a result, the wind force received by the left end side of the work W from the contactless support roll 20a is weakened, and the wind force received by the right end side of the work W from the contactless support roll 20a becomes stronger so that the pressure Fl to move in the left direction is applied to the work W. The pressure Fl to move in the left direction increases as the amount of counterclockwise rotation of the contactless support roll 20a approaches 90 degrees. The pressure Fl to move in the left direction causes the work W to move in the left direction toward the target position in the width direction B.

Comparing the scheme of rotating the contactless support roll 20a in the yaw direction according to the embodiment with the scheme of rotating the contactless support roll 20a in the roll direction according to the comparative example, the load that the work W receives from the contactless support roll 20a at the time of correction is larger in the scheme according to the comparative example. In the method according to the comparative example, the portion on the right side of the work W supported by the contactless support roll 20a sinks when the right end of the contactless support roll 20a is tilted toward the floor surface as shown in FIG. 8B so that a load is applied to the work W as if to cause the length of the right side of the work W is smaller than the length of the left side. This load makes it easy for the work W to be torn in the width direction B. In the method according to the embodiment, on the other hand, the load received by the work W from the contactless support roll 20a at the time of correction is small so that the risk of breaking the work W can be minimized.

As described above, it is possible, with the conveyer apparatus 1 according to this embodiment, to minimize the risk of the work W to be conveyed in floatation conveyance being broken, by rotating the contactless support roll 20a in the yaw direction to correct meandering of the work W. Floatation conveyance is free from resistance to contact with the roll and enables low-tension conveyance. Floatation conveyance is suitable for conveying a thin film that is vulnerable to a change in tension during conveyance. For example, it is suitable for conveying a thin metal film.

In particular, a lithium foil is suited to floating transportation because it is lightweight and bonded to metals easily. For example, a lithium foil can be used as a negative electrode material of a lithium metal secondary battery. It can also be used as a pre-doped material of the negative electrode of a lithium ion secondary battery or a lithium ion capacitor.

However, a lithium foil is lightweight and so easily meanders and is vulnerable to a change in tension. Therefore, low-load meandering correction is required, and, according to the conveyer apparatus 1 of this embodiment, low-load meandering correction can be realized.

The work W conveyed by the conveyer apparatus 1 according to this embodiment is not limited to a lithium foil and can also include other metal foils such as copper foil, aluminum foil, stainless steel foil, and titanium foil. In addition, resin film, paper, cloth, nonwoven fabric, etc. can also be included.

The embodiments of the present disclosure are described above in detail. The embodiments described above are merely specific examples of practicing the present disclosure. The above-described embodiment can also be configured to include a working process such as hole drilling, rolling process, and solvent coating on the work. The details of the embodiment shall not be construed as limiting the technical scope of the present disclosure. A number of design modifications such as modification, addition, deletion, etc. of constituting elements may be made to the extent that they do not depart from the idea of the invention defined by the claims. New embodiments with design modifications will provide the combined advantages of the embodiment and the variation. Although the details subject to such design modification are emphasized in the embodiment described above by using phrases such as "of this embodiment" and "in this embodiment", details not referred to as such are also subject to design modification. Any combination of constituting elements included in the respective embodiments is also useful as an embodiment of the present disclosure. Hatching in the cross section in the drawings should not be construed as limiting the material of the hatched object.

In the above embodiment, the contactless support roll 20a configured to blow air onto the conveyed work W to float the work W has been described as the contactless support roll 20a. In this regard, a contactless support roll of another type may also be used so long as it is a contactless support roll that can support the work W contactlessly using a force acting contactlessly on the work W. For example, an ultrasonic contactless support roll may be used. In an ultrasonic contactless support roll, a vibrating plate (e.g., a sonotrode) is installed on the conveyance surface facing the work W, and the vibrating plate is slightly vibrated at a high frequency, thereby forming a squeeze air film between the work W and the conveyance surface and floating the work W by the repulsive force from the squeeze air film.

The embodiments may be defined by the following items.

Item 1

A conveyer apparatus (1) including: a floatation roll (20 a) that supports a work (W) to be conveyed contactlessly using a force applied to the work (W) contactlessly, the floatation roll (20 a) having a cylindrical shape extending in a direction of width (B) of the work (W), and at least a surface of the floatation roll (20 a) facing the work (W) being formed by a circumferential surface; and a driving unit (20 f) that rotates the floatation roll (20 a) in a yaw direction, wherein, of a wrap angle ($\alpha$) of the work (W) supported by the floatation roll (20 a) contactlessly, a wrap angle on an entry side ($\alpha$in) with respect to an apex point (P1) and a wrap angle on an exit side ($\alpha$o) with respect to the apex point (P1) are set to be different.

This realizes meandering correction with a low risk of a work (W) to be conveyed in floatation conveyance being broken.

Item 2

The conveyer apparatus (1) according to Item 1, further including:

a control unit (50) that determines an amount of rotation of the floatation roll (20 a) in the yaw direction based on an amount of misalignment of the work (W) in the direction of width (B) and controls the driving unit (20 f) based on the amount of rotation determined.

This enables feedback control based on an amount of misalignment of the work (W) in the direction of width (B).

Item 3

The conveyer apparatus (1) according to Item 2, wherein, in a case where the wrap angle on the entry side ($\alpha$in) is set to be larger than the wrap angle on the exit side ($\alpha$o), the control unit (50) causes, when the work (W) is misaligned rightward with respect to a conveyance direction (A) from a target position in the direction of width (B), the driving unit (20 f) to rotate the floatation roll (20 a) clockwise in accordance with the amount of misalignment and causes, when the work (W) is misaligned leftward with respect to the conveyance direction (A) from the target position in the width direction (B), the driving unit (20 f) to rotate the floatation roll (20 a) counterclockwise in accordance with the amount of misalignment.

In a case where the wrap angle on the entry side ($\alpha$in) is set to be larger than the wrap angle on the exit side ($\alpha$o), this can guide the work (W) to the target position by the angular difference and the rotation of the floatation roll (20 a) in the yaw direction.

Item 4

The conveyer apparatus (1) according to claim 2, wherein, in a case where the wrap angle on the entry side ($\alpha$in) is set to be smaller than the wrap angle on the exit side ($\alpha$o), the control unit (50) causes, when the work (W) is misaligned rightward with respect to a conveyance direction (A) from a target position in the direction of width (A), the driving unit (20 f) to rotate the floatation roll (20 a) counterclockwise in accordance with the amount of misalignment and causes, when the work (W) is misaligned leftward with respect to the conveyance direction (A) from the target position in the width direction (B), the driving unit (20 f) to rotate the floatation roll (20 a) clockwise in accordance with the amount of misalignment.

In a case where the wrap angle on the entry side ($\alpha$in) is set to be smaller than the wrap angle on the exit side ($\alpha$o), this can guide the work (W) to the target position by the angular difference and the rotation of the floatation roll (20 a) in the yaw direction.

Item 5

The conveyer apparatus (1) according to any one of Items 1 through 4, wherein the work (W) is a lithium foil.

According to this, it is possible to convey a lithium foil, which is lightweight and is broken easily, while performing meandering control with a low risk of the work being broken.

Item 6

A meandering correction method adapted to rotate a floatation roll (20 a) in a yaw direction based on an amount of misalignment, in a direction of width (B), of a work (W) to be conveyed, the floatation roll (20 a) supporting the work (W) contactlessly using a force applied to the work (W) contactlessly, the floatation roll (20 a) having a cylindrical shape extending in the direction of width (B) of the work (W), and at least a surface of the floatation roll (20 a) facing the work being formed by a circumferential surface, wherein, of a wrap angle ($\alpha$) of the work (W) supported by the floatation roll (20 a) contactlessly, a wrap angle on an entry side ($\alpha$in) with respect to an apex point (P1) and a wrap angle on an exit side ($\alpha$o) with respect to the apex point (P1) are set to be different.

This realizes meandering correction with a low risk of a work (W) to be conveyed in floatation conveyance being broken.

What is claimed is:

1. A conveyer apparatus comprising:

a floatation roll that supports a work to be conveyed contactlessly using a force applied to the work contactlessly, the floatation roll having a cylindrical shape extending in a direction of width of the work, and at least a surface of the floatation roll facing the work being formed by a circumferential surface;

a driving unit that rotates the floatation roll in a yaw direction; and a control unit that determines an amount of rotation of the floatation roll in the yaw direction based on an amount of misalignment of the work in the direction of width and controls the driving unit based on the amount of rotation determined, wherein, of a wrap angle of the work supported by the floatation roll contactlessly, a wrap angle on an entry side with respect to an apex point and a wrap angle on an exit side with respect to the apex point are set to be different wherein, in a case where the wrap angle on the entry side is set to be larger than the wrap angle on the exit side, the control unit causes, when the work is misaligned rightward with respect to a conveyance direction from a target position in the direction of width, the driving unit to rotate the floatation roll clockwise in accordance with the amount of misalignment and causes, when the work is misaligned leftward with respect to the conveyance direction from the target position in the direction of width, the driving unit to rotate the floatation roll counterclockwise in accordance with the amount of misalignment.

2. The conveyer apparatus according to claim 1, wherein the work is a lithium foil.

3. A meandering correction method, comprising:

rotating, by a driving unit, a floatation roll in a yaw direction based on an amount of misalignment, in a direction of width, of a work to be conveyed;

supporting, by the floatation roll, the work contactlessly using a force applied to the work contactlessly, the floatation roll having a cylindrical shape extending in the direction of width of the work, and at least a surface of the floatation roll facing the work being formed by a circumferential surface, wherein, of a wrap angle of the work supported by the floatation roll contactlessly, a wrap angle on an entry side with respect to an apex point and a wrap angle on an exit side with respect to the apex point are set to be different wherein, in a case where the wrap angle on the entry side is set to be larger than the wrap angle on the exit side; and a control unit causing, when the work is misaligned rightward with respect to a conveyance direction from a target position in the direction of width, the driving unit to rotate the floatation roll clockwise in accordance with the amount of misalignment and causing, when the work is misaligned leftward with respect to the conveyance direction from the target position in the direction of width, the driving unit to rotate the floatation roll counterclockwise in accordance with the amount of misalignment.

* * * * *